July 8, 1969    E. J. JOHNSON    3,453,708
CONTINUOUS POTTERY KILN WITH SLIDABLE STRETCHERS
Original Filed May 8, 1964    Sheet 1 of 7
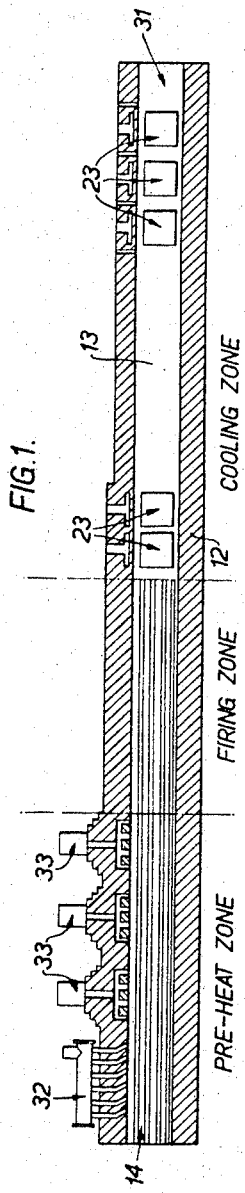
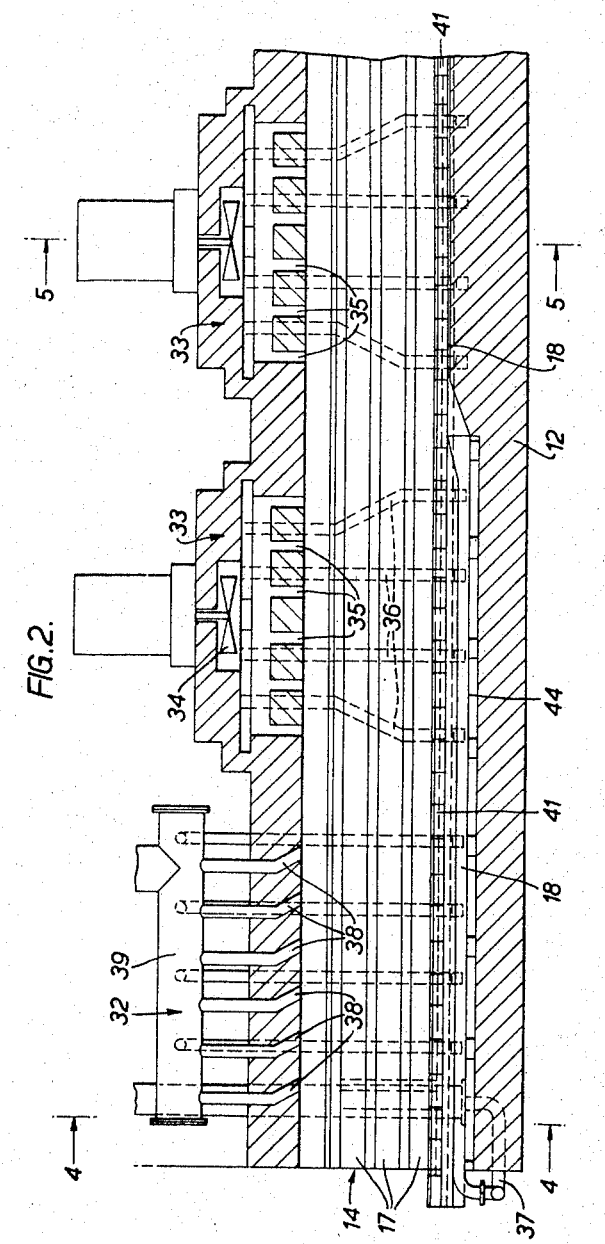
Inventor:
Ernest J. Johnson
By Kenyon Palmer Stewart
& Estabrook Attorneys

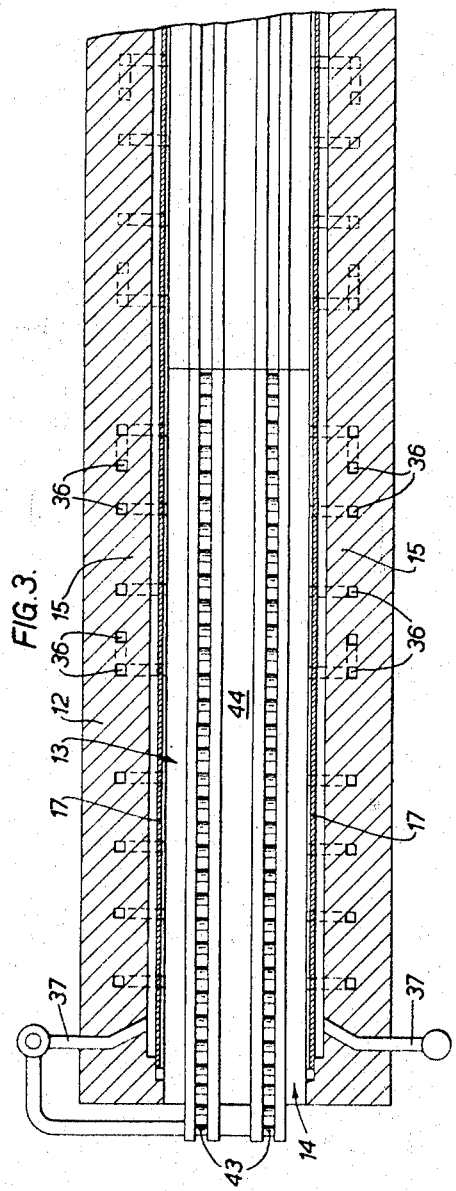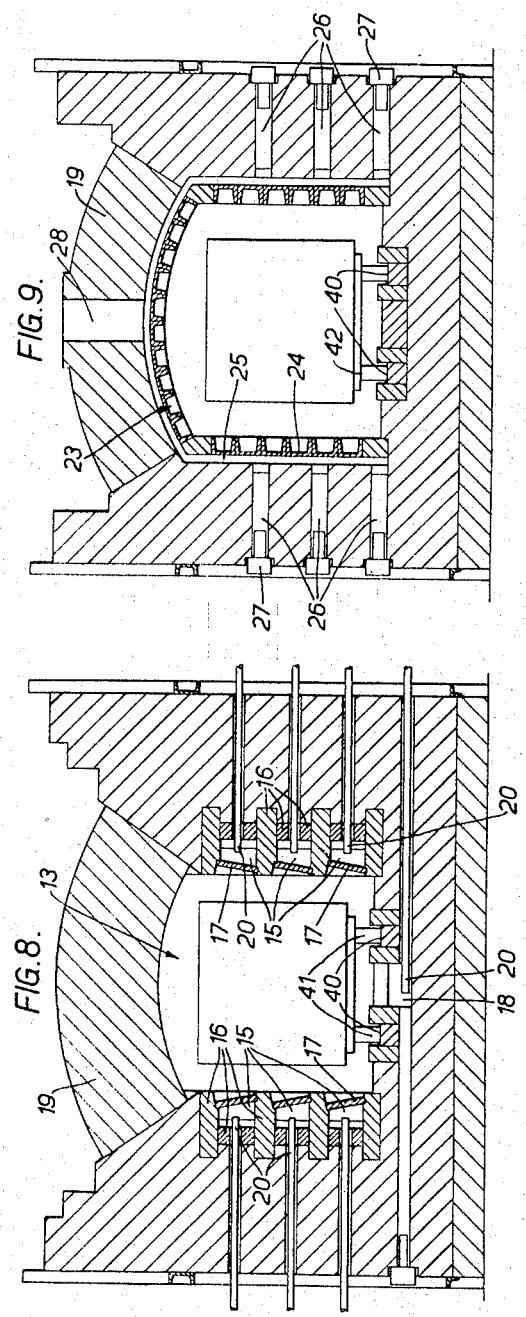

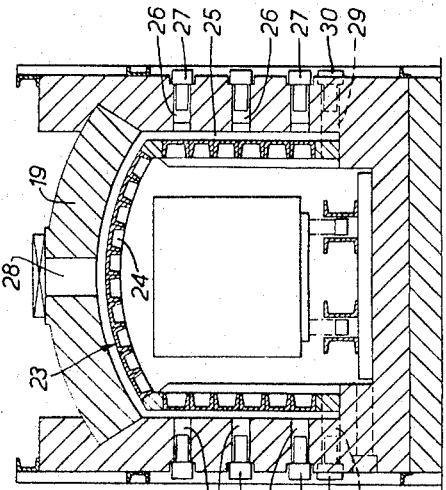
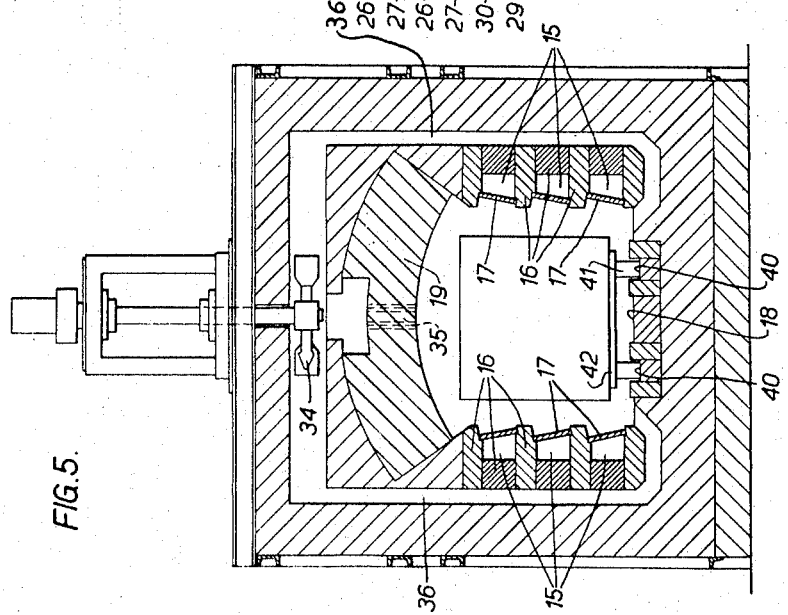

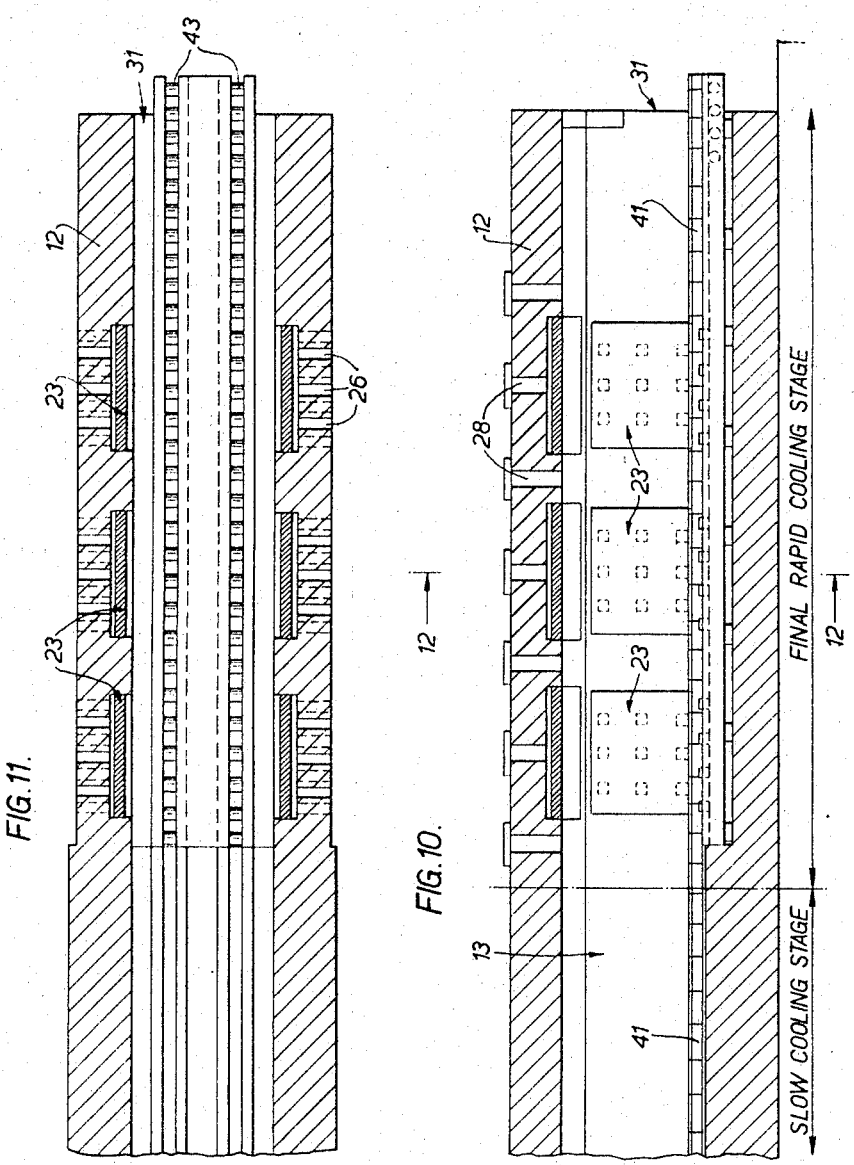

United States Patent Office 3,453,708
Patented July 8, 1969

3,453,708
CONTINUOUS POTTERY KILN WITH SLIDABLE STRETCHERS
Ernest James Johnson, Stone, England, assignor to The West Midlands Gas Board, Solihull, Warwickshire, a body corporate, & Johnson Brothers (Hanley) Limited, Hanley, Stoke-on-Trent, Staffordshire, a British company
Continuation of application Ser. No. 366,045, May 8, 1964. This application Dec. 4, 1967, Ser. No. 687,917
Int. Cl. F27b 9/26, 5/02
U.S. Cl. 25—142                              15 Claims

ABSTRACT OF THE DISCLOSURE

Fast-firing continuous pottery kilns are improved by (a) platforms for supporting the ware formed of a combination of refractory stretchers and supported setters that defines a bottom heating section in the kiln firing zone, (b) a plurality of longitudinally extending combustion chambers on the side walls of the firing zone to provide accurate control to temperature gradients along the firing zone, (c) totally supporting ware in passage through the firing zone by slidable engagement between stretchers and grooves or channels in the solid floor of the kiln, thereby eliminating use of bogies and permitting greater uniformity and efficiency in heating of the ware, and (d) division of the kiln cooling zone into several stages which include rapid cooling stages before and after a slow cooling stage.

---

This application is a continuation of my application Ser. No. 366,045, filed May 8, 1964 and now abandoned.

This invention relates to pottery kilns. Large ceramic articles such as sanitary ware are usually fired in continuous tunnel kilns through which the ware is passed on bogies. The platforms of the bogies form the effective floor of the kiln which, accordingly, does not normally form part of the heating surface of the kiln. In fact, the bogies, together with the ware supporting refractories, absorb a large proportion of the heat input to the kiln with consequent waste of heat as they pass along and out of kiln. These facts and the large cross-sectional area of the tunnel make it difficult to heat up the ware uniformly and, consequently the ware must be heated slowly so that firing takes a long time.

It is an object of the present invention to provide an improved continuous pottery kiln through which ware is moved and passes through pre-heat, firing and cooling zones on ware-supporting platforms.

It is a further object of the invention to provide mountings for supporting the ware-supporting platforms which afford slidable, guided support of the platforms through the passage.

It is a further object of the invention to provide improved control of the temperature distribution across cross-sections of the firing zone by the use and control of longitudinal combustion chambers for individually heating the passage by heat transmitted through at least the floor and side walls of the passage.

Yet another object of the invention is to provide greater control over the temperature gradients along sections of the passage and to enable work to be satisfactorily fired in a much shorter time than has hitherto been regarded as possible.

A further object of the invention is to enable economy to be effected in the fuel consumed.

With these objects in view and other objects which will later appear the present invention consists in a continuous pottery kiln having a single passage through which ware is moved and passes through pre-heat, firing and cooling zones on ware-supporting platforms spaced from the floor of the passage on mountings which afford slidable, guided support of the platforms along at least the medial and major part of the length of the passage, the firing zone being provided with longitudinal combustion chambers for indirectly heating the passage by heat transmitted through at least the floor and side walls of the passage, and the heat input of the combustion chambers to the firing zone being variable in a manner enabling the temperature distribution across cross-sections of the firing zone to be controlled.

There may be additional longitudinal combustion chambers in the roof. The heat input to the passage from the various combustion chambers can be arranged, and possibly varied in service, to maintain a more nearly uniform temperature throughout vertical cross-sections of the passage than has been obtainable with conventional tunnel kilns. The heated floor, in particular, helps to avoid the cool zone which is apt to occur in tunnel kilns along the middle of the bottom of the kiln and which is usually occupied by the greatest mass of the ware. This results in better ware quality and, by enabling faster firing cycles to be employed, speeds up production generally and makes production more flexible.

The longitudinal chambers may be extended through the pre-heat zone to enable the products of combustion from the firing zone to be passed through the pre-heat zone and provide indirect heating of the ware. Provision may also be made for the products of combustion to be introduced directly into the passage at any point along the length of the combustion chambers to give direct heating for the ware provided that the heating of the ware has reached such a stage and the products so introduced are of such a nature that the ware will not suffer.

It is well known that there is a critical temperature range in the cooling of all ware in which the ware must be cooled slowly to avoid its being harmed. The cooling zone may include rapid cooling stages before and after a slow cooling stage in which the ware cools through this critical temperature range. At the rapid cooling stages the furnace construction preferably takes the form of a muffle surrounding the passage and cooled by natural draught circulation of air around the exterior of the muffle. The temperature gradient in the cooling zone may also be influenced by a flow of air contra to the direction of movement of the ware to cool the ware directly. This flow of air may pass through all the zones of the passage and, since it receives heat from the outgoing ware in the cooling zone and as it passes through the firing zone, it may be used to heat directly ware in the pre-heat zone. The flow of air may be induced by a blower at the ware exit end of the passage and by a controllable exhaust system at the ware-entry end of the passage which also removes combustion gases from the combustion chambers. Means may be provided for recirculating the air in the pre-heat zone from top to bottom to provide more uniform temperature distribution and improved heat transfer. Air may possibly also be recirculated along short stretches of the passage in the zone to enable the temperature gradient along the length of the zone to be varied.

The combustion chambers may be supplied with gaseous fuel by burners near the ware-exit end of the firing zone, the hot products of combustion being induced to flow along the combustion chambers in the direction opposite to that of the ware. By supplying a deficiency of primary air at the burner and supplying further air to the combustion chamber as secondary air near the burner and/or as tertiary air supplied at one point or at spaced points along the length of the combustion chamber in the firing zone and providing means for adjusting the air supplies the temperature gradient along the passage in the firing zone can be regulated.

The floor of the kiln may be provided with a pair of continuous parallel grooves or channels which extend for the medial and major part of the length of the passage and accommodate two rows of refractory stretchers across which are placed setters or bats forming the platforms for supporting the ware.

The grooves or channels may be formed by suitably grooved base tiles arranged with their grooves aligned or may be formed from standard brickwork. This arrangement gives good location of the ware in the passage and reduces the risk of "wrecks" as the ware passes through the passage. The stretchers are pushed through the passage by hydraulic or mechanical pushing means. Less effort is required to push ware through the passage on stretchers in grooves than on bats on a flat passage floor. The arrangement also of course does away from bogies as used in known kilns and enables the heating of the passage floor to be effective since there is little nor no waste of heat.

A longitudinal combustion chamber for the floor may be provided between the grooves and is preferably open-topped, the stretchers and setters or bats effectually closing the chamber.

An embodiment of the invention will now be described by way of example with reference to the accompanying drawings in which:

FIGURE 1 is a small scale diagrammatic view in section of a single passage kiln according to the present invention.

FIGURE 2 is a simplified longitudinal section of a portion of a pre-heat zone of the kiln.

FIGURE 3 is a simplified horizontal section of the same portion of the pre-heat zone shown in FIGURE 2.

FIGURE 5 is a vertical cross-section taken on the line 5—5 of FIGURE 2.

FIGURE 8 is a vertical cross-section through the firing zone taken on line 8—8 of FIGURE 6.

FIGURE 9 is a vertical cross-section through the initial stage of the cooling zone taken on the line 9—9 of FIGURE 6.

FIGURE 10 is a simplified longitudinal section of intermediate and final stages of the cooling zone of the kiln.

FIGURE 11 is a simplified horizontal section of the intermediate and final stages of the cooling zone.

FIGURE 12 is a vertical cross-section through the final stage of the cooling zone taken on the line 12—12 of FIGURE 10.

The pottery kiln has a single, continuous longitudinal passage 13 along which the ware to be fired is passed. The ware enters the passage 13 at one end 14 and passes in turn through a pre-heat zone, as indicated in FIGURE 1, a firing zone and a cooling zone of the kiln before leaving the kiln at the other end 31 of the passage. The passage is enclosed by an outer casing 12 of suitable refractory and insulating tiles or bricks.

Figure 4:
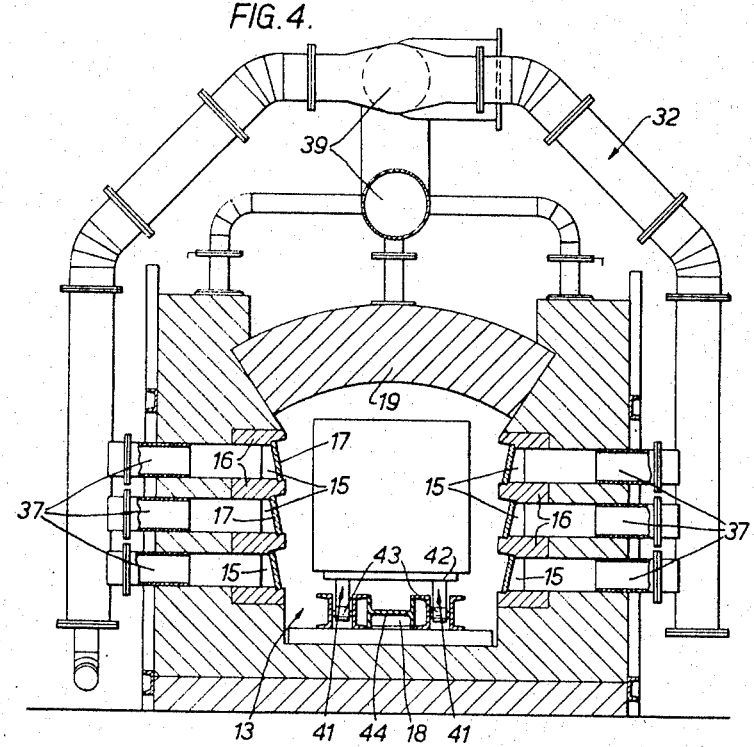
FIGURE 4 is a vertical cross-section through the pre-heat zone taken on the line 4—4 of FIGURE 2.
Figure 15:
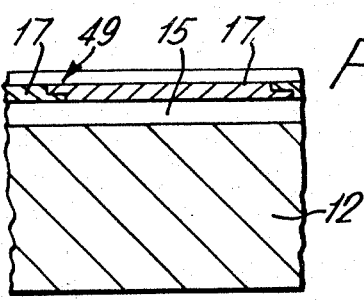
FIGURE 15 is an enlarged fragmentary sectional plan of part of FIGURE 7.

Extending longitudinally along the side walls of the passage in the firing zone and continuing through the pre-heat zone to the entrance 14 to the passage are combustion chambers 15. In this particular example there are three longitudinal combustion chambers 15 arranged one above the other on each side wall of the firing and pre-heat zones of the passage. The combustion chambers 15 are defined by rows of channel forming blocks 16 incorporated in the brickwork of the kiln, as shown in FIGURES 4, 5 and 8. Instead of channel forming blocks, channel-shaped blocks may be used. The open sides of the channels formed by the blocks 16 are towards the passage and are covered by readily replaceable refractory tiles 17. These tiles 17 are relatively thin and of high heat conductivity refractory material so that they conduct heat well. The tiles 17 rest in grooves in the lower flange of each channel and are inclined to lean against a shorter upper flange of the channel so that the faces of the tiles 17 on the passage side are inclined slightly upwards. The vertical joints between adjacent tiles are covered by rebated portions 49 (FIGURE 15). If a tile should become damaged it can very easily be replaced without disturbing the brickwork of the kiln.

In addition to the combustion chambers 15 in the side walls of the passage there is a single longitudinal combustion chamber 18 which extends along the middle of the floor of the firing zone and also continues through the pre-heat zone. The channel of this combustion chamber 18 in the firing zone and greater part of the pre-heat zone is formed in a similar way to that of the side combustion chambers 15 with the open side of the channel upwards. It is not however covered by tiles though it is effectually closed as will later be seen. For the remaining part of the pre-heat zone, the initial part of the zone which the ware enters first, the floor combustion chamber is formed by a metal duct 44, of rectangular tubular cross-section.

The roof of the passage is formed by solid refractory bricks 19 and is arched to increase the surface area for receiving heat by radiation from the upwardly inclined tiles covering the said combustion chambers and by conduction from the surrounding brickwork of the kiln. In this particular example of the kiln the roof of the passage receives sufficient heat by this means to render it an adequate heating surface without the provision of combustion chambers and burners in the roof itself. Combustion chambers may, however, be provided in the roof of the passage along at least the firing zone if required in kiln constructions where the roof would not otherwise be adequately heated.

Figure 6:
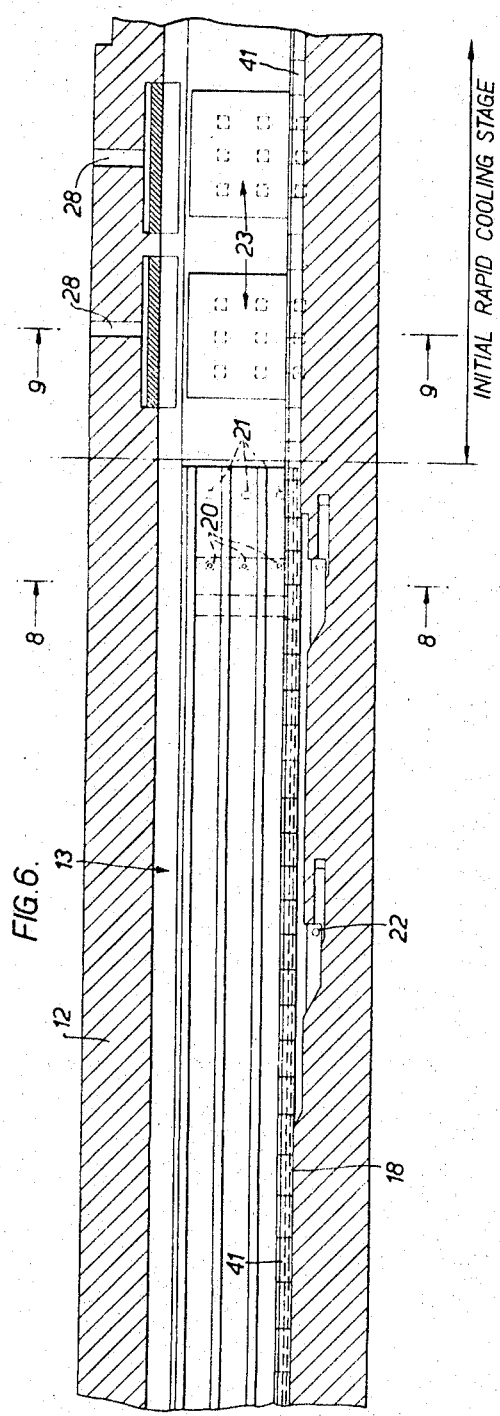
FIGURE 6 is a simplified longitudinal section of a firing zone of the kiln and initial stage of a cooling zone.
Figure 7:
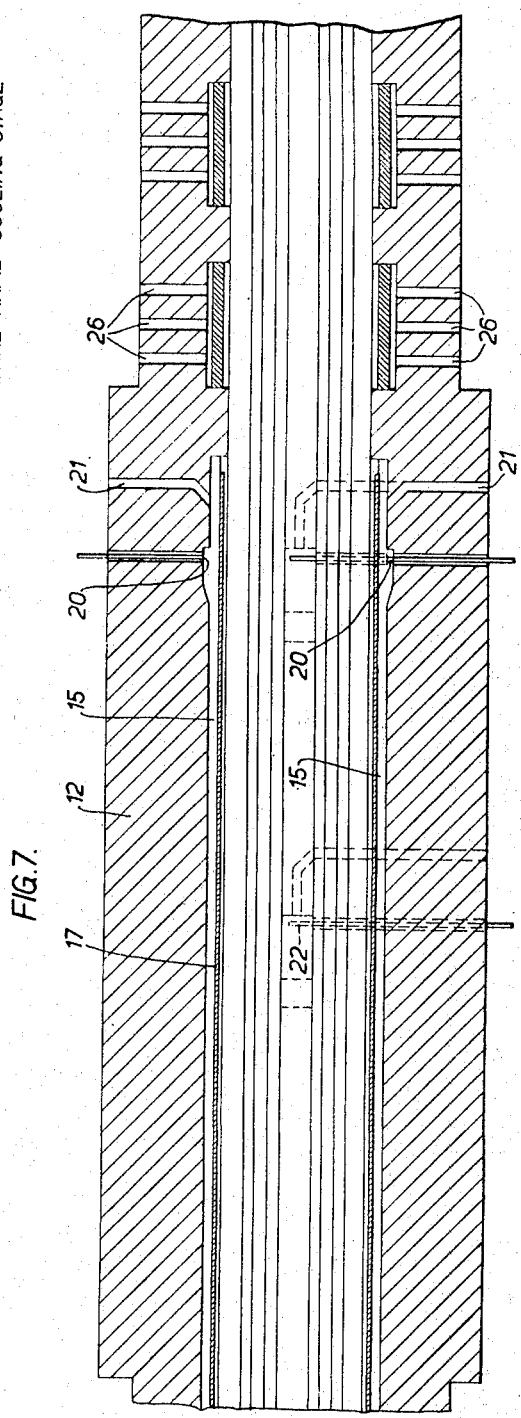
FIGURE 7 is a simplified horizontal section of the firing zone and initial stage of the cooling zone.
Figure 13:
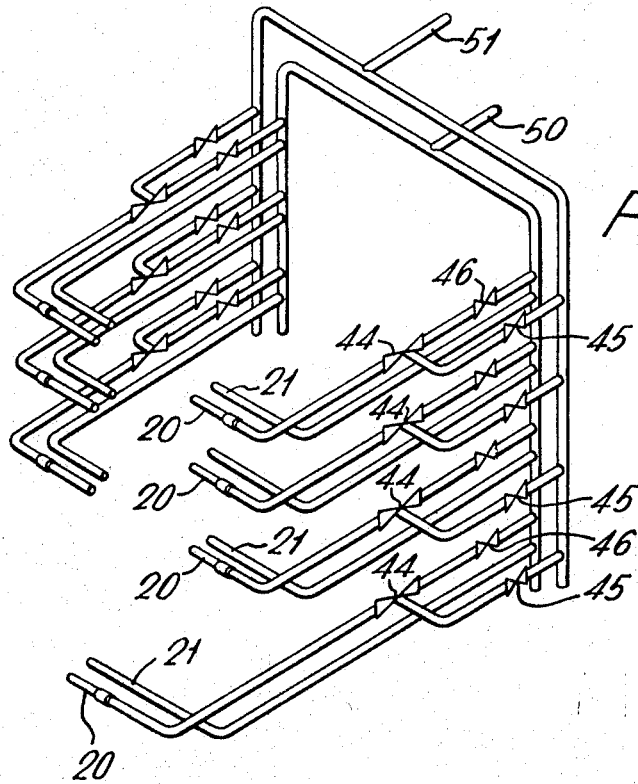
FIGURE 13 is a diagrammatic perspective view showing the controls for individual burners in the firing zone.

In the firing zone, burners 20, FIGURES 6, 7 and 8, introduce gaseous fuel into the side combustion chambers 15 and floor combustion chamber 18 at points close to the ware-exit end of the firing zone adjacent the cooling zone. In the vicinity of the burners 20 a deficiency of primary air is supplied to the combustion chambers. The remaining air required for complete combustion is supplied to the combustion chambers as secondary air behind the burners 20, that is between the burners and the ware-exit end of the firing zone. The secondary air is drawn from outside the kiln and supplied to the combustion chambers through supply pipes 21. This secondary air cools the walls of the passage and marks a clear boundary of the firing zone. At the same time this air receives heat from the outgoing ware so that the secondary air reaching the burner is pre-heated. If necessary tertiary air may be supplied at one point or a plurality of spaced points along the length of the firing zone. Valves or dampers are provided to control the flow of primary, secondary and tertiary air at each point of admission. An additional burner 22 is provided in the floor combustion chamber at a point approximately mid-way along the firing zone and this burner too is supplied with secondary air introduced into the combustion chamber behind the burner. Each of the burners 20 and the additional burner 22 is provided with its own gas/air injector 44 and the adjusting valves 45, 46 through which it is connected to a gas supply pipe 50 and air supply pipe 51 (FIGURE 13), so that the supply to each burner can be regulated independently of the others. In addition, provision is made, although not shown in the drawings, for automatic adjustment of the gas/air mixture to suit the heat requirements of the kiln in the firing zone. The secondary air supply can also be adjusted to suit combustion and temperature requirements.

The disposition of the combustion chambers in the firing zone and the provision for independent regulation of the burners and secondary air supply serving the combustion chambers, enables the heat input to the kiln to be arranged, and possibly varied in service, to maintain a more nearly uniform temperature throughout vertical cross-sections of the passage than has been obtainable with conventional tunnel kilns.

As the ware passes through the pre-heat zone it is heated indirectly by the heat contained in the products of combustion flowing along the combustion chambers from the firing zone.

The ware on leaving the firing zone passes directly through the cooling zone before leaving the passage. The cooling zone is divided into three stages: an initial rapid cooling stage as indicated in FIGURE 6, a slow cooling stage and a final rapid cooling stage which are both indicated in FIGURE 10. Cooling of the ware in the rapid cooling stages is mainly indirect. The construction of the kiln at the two rapid cooling stages is very similar as will be appreciated from FIGURES 6, 7, 10 and 11 and in particular from the cross-sectional views 9 and 12. In both cases the kiln construction takes the form of a muffle 23 surrounding the sides and roof of the passage which is cooled by natural draught circulation of air around the exterior of the muffle. The muffle 23 is formed from box-shaped blocks 24 arranged with their open sides towards the passage. Between the muffle 23 and the outer casing of the kiln there is a space 25, FIGURES 9 and 12, around which cooling air circulates. The cooling air reaches the space 25 through a number of air passages 26 leading from the sides of the kiln exterior to the space. Each air passage 26 is fitted at its outer end with a plug 27 which can be withdrawn to alter the amount and way in which air is caused to circulate around the muffle. The cooling air may be blown into the air passages 26 by fans. Air which has circulated around the space 25 leaves the kiln by flues 28. It may be allowed to escape to atmosphere but preferably it is put to some use, for example, it may be piped to a drying room. In the final rapid cooling stage there are air passages 29 which open into the passage itself close to the floor of the passage, FIGURE 12, and are fitted at their outer ends with plugs 30 which can be removed to admit cooling air into the passage to assist in direct cooling of the ware.

In the slow cooling stage the ware is subjected to direct cooling only. During this stage the ware is cooled through the critical temperature range in which, as is well known, the rate of cooling must be very slow in order that the ware shall not be harmed. Outside this critical range rapid cooling does not harm the ware. The direct cooling is done by a flow of air through the passage induced by an air blower, not shown, at the ware-exit end of the passage and an exhaust system 32 incorporated at the commencement of the pre-heat zone. This flow of air also assists to a small degree in cooling the ware as it passes through the rapid cooling stages; the cooling of the ware in these stages being effected mainly indirectly as previously stated.

As the flow of air passes along the passage it receives a certain amount of heat in the cooling zone from the outgoing ware and considerably more heat as it passes through the firing zone. The flow of air thus heated then assists in the heating of the incoming ware as it passes through the pre-heat zone.

To ensure uniform temperature distribution and improve heat transfer in the pre-heat zone and to enable the temperature gradient along the length of this zone to be varied means are provided for recirculating the heated flow of air. In this embodiment three recirculation units 33 are incorporated in the pre-heat zone of the kiln at spaced positions along its length, each unit being independent of the others. Each recirculation unit 33, as shown in FIGURES 2, 3 and 5, includes a fan 34 above the passage roof which draws the heated air from the passage through longitudinally spaced inlet ducts 35 in the passage roof and returns it to the passage, at floor level, by way of outlet ducts 36 extending downwards at the back of the combustion chambers along each side of the passage. Dampers, not shown, are provided in the inlet and outlet ducts 35 and 36 which can be individually operated to vary the amount and place of withdrawal and reintroduction of the air. For example, the air could be withdrawn almost entirely at the inlet ducts 35 nearest the passage entrance and be reintroduced at the outlet ducts 36 furthest away. A steeper temperature gradient than that produced by the indirect and direct heating already described, may be obtained in the pre-heat zone by introducing products of combustion into the passage from the combustion chambers. This is easily done by removing one or more of the tiles 17 closing the combustion chambers. Since all the tiles are readily removable, a tile or tiles can be removed to admit the products of combustion into the passage at any part of the firing or pre-heat zones as required. It is of course very important that, if the temperature gradient is steepened in this way, the products of combustion are introduced at such a stage in the pre-heating of the ware, and the products are of such a nature, that the ware will not suffer.

The exhaust system 32 incorporated at the commencement of the pre-heat zone withdraws from the kiln not only the air flowing through the passage, and products if introduced, but also the products of combustion from the combustion chambers. Fans, not shown, draw the products from the side and floor combustion chambers by way of exhaust ducts 37, and the air from the passage by exhaust ducts 38, into manifolds 39 above the kiln, from whence they are allowed to escape into the atmosphere, or, as in the case of the cooling air in the rapid cooling stages, put to further use. The suction in the exhaust system is controlled by a damper or dampers, not shown, automatically operated and working in conjunction with a temperature sensing device suitably positioned in the kiln.

In the floor of the passage a pair of continuous parallel grooves 40 are formed which extend the length of the pasage and accommodate two rows of refractory stretchers 41 across which are placed setters or bats 42 for supporting the ware. The grooves 40 are provided on either side of the open floor combustion chamber in the firing and pre-heat zones of the passage. The stretchers 41 and setters or bats 42 effectually close the combustion chamber from the part of the passage occupied by the ware. The grooves 40 are formed from standard brickwork but may be formed by suitably grooved base tiles arranged with their grooves aligned. The stretchers 41 are pushed through the pasage by variable speed hydraulic or mechanical pushing means not shown. In order to reduce the total load on the pushing means a roller conveyor system 43 is provided in the base of the passage at the entrance to and exit from the kiln as shown in FIGURES 3 and 11 respectively.

This arrangement of suporting the ware gives good location of the ware in the passage and reduced the risk of wrecks as the ware passes through the passage. Less effort is required to push ware through the passage on stretchers in grooves than on bats on a flat passage floor.

Figure 14:
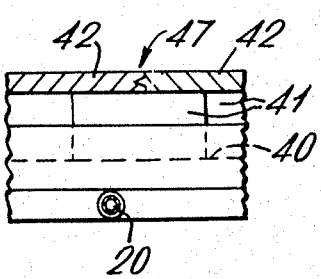
FIGURE 14 is a fragmentary sectional view on line 14—14 of FIGURE 8.

As a precaution against collapse of the ware supporting setters or bats 42 in the event of fracture, the edges of the setters or bats are suitably rebated, as shown at 47 in FIGURE 14, to provide loose interconnections between adjacent setters or bats. In this way if a setter or bat is fractured it will be supported by those adjacent to it.

A kiln as described in general enables a faster firing cycle to be employed than in hitherto known tunnel kilns with the result that production is speeded up and production is more flexible. The uniformity of heating and cooling and contdol afforded in all the zones of the kiln results in better ware quality.

The manner of suporting the ware in the passage and the heated floor are particularly important in bringing about a greater efficiency in the kiln since the so called cool zone is avoided which is apt to occur in known tunnel kilns along the middle of the bottom of the kiln which is usually occupied by the greatest mass of the ware.

This kiln can be used for biscuit ware, that is for merely hardening the clay, for glossed ware in which for a second firing glaze is applied to the biscuit ware and refined, and for "once fired" ware in which the glaze is applied to the clay and only a single firing done. For the second firing of glossed ware, the ware, being already hardened, must not be treated to severe thermal shocks so that a more gradual temperature gradient along the pre-heat zone is necessary than for biscuit ware. It is for this reason that the combustion chambers have been continued right through the pre-heat zone. For biscuit ware, products of combustion may be admitted into the pre-heat zone in the manner previously described so as to obtain a steeper longitudinal temperature gradient in the zone and enable the whole firing cycle to be speeded up.

I claim:

1. A continuous pottery kiln having longitudinally extending pre-heat, firing and cooling zones and comprising a body defining a single ware-receiving passage; a solid floor provided with a pair of continuous parallel grooves or channels which extend for at least the medial and major part of the length of the passage; a row of refractory stretchers resting in and slidable along each of the grooves or channels; setters, forming ware-supporting platforms, extending across and resting on the two rows of stretchers and movable therewith along the passage; longitudinal combustion chamber means in the body along the firing zone for heating the passage indirectly by heat transmitted through the side walls of the passage; and longitudinal combustion chamber means in the floor and defined at least in part by the setters and stretchers and heating directly the underside of the setters.

2. A continuous pottery kiln according to claim 1 wherein overlapping joints are formed between the forward and rearward edges of adjacent setters providing support for a fracturing setter by an adjacent setter.

3. A continuous pottery kiln having longitudinally extending pre-heat, firing and cooling zones and comprising a body defining a single ware-receiving passage having a solid floor and side walls, ware-supporting platforms in said passage formed by two rows of refractory stretchers across which rest setters, the floor of the kiln being provided with a pair of continuous parallel grooves or channels which extend for the medial and major part of the length of said passage, said grooves or channels affording slidable guiding support for said stretchers throughout at least a major part of the length of said passage, longitudinal combustion chamber means in said body along the firing zone for heating said passage indirectly by heat transmitted through at least the floor and side walls of said passage, the combustion chamber means in the floor extending substantially along the full length of said firing zone and directly heating the underside of said setters and the combustion means in said side walls comprising at least two longitudinal combustion chambers in vertically spaced relation, and means for varying the heat input of said combustion chamber means in a manner enabling the temperature distribution across cross-sections of the firing zone to be controlled.

4. A continuous pottery kiln according to claim 3 wherein longitudinal combustion chambers are extended into the pre-heat zone to enable the products of combustion to be passed to the pre-heat zone and heat the ware indirectly.

5. A continuous pottery kiln according to claim 3 wherein means are provided for passing products of combustion from combustion chambers into the passage.

6. A continuous pottery kiln according to claim 3 wherein the longitudinal combustion chambers in the side walls comprise rows of channel forming blocks included in the brickwork of the kiln with the open sides of the channel towards the passage and covered by readily replaceable refractory tiles.

7. A continuous pottery kiln having longitudinally extending pre-heat, firing and cooling zones and comprising a body defining a single ware-receiving passage, ware-supporting platforms in the passage, mountings affording slidable, guided support of the platforms along at least the medial and major part of the length of the passage comprising channels or grooves with stretchers slidable therein, longitudinal combustion chamber means in the body for heating the passage indirectly by heat transmitted through at least the floor and side walls of the passage and means for varying the heat input of the combustion chambers to the firing zone in a manner enabling the temperature distribution across cross-sections of the firing zone to be controlled, the longitudinal combustion chamber means in the floor directly heating the underside of the ware-supporting platforms and the longitudinal combustion chambers in the side walls being formed in the brickwork of the kiln both in the firing zone and the pre-heat zone by formations defining channels with the open sides of the channels towards the passage and covered by readily replaceable refractory tiles and being adapted for passing products of combustion into the portion of the passage in the pre-heat zone by removing a tile.

8. A continuous pottery kiln according to claim 7 wherein the tiles for combustion chambers in the side walls of the passage engage locating formations in the lower flange of the channel and are inclined so as to lean against narrower upper flanges of the channel.

9. A continuous pottery kiln according to claim 3 wherein the combustion chamber provided in the floor of the passage is an open-topped channel effectually closed from the part of the passage occupied by said ware by the combination of said stretchers and said setters.

10. A continuous pottery kiln according to claim 3 wherein the cooling zone of the kiln includes at least one rapid cooling stage.

11. A continuous pottery kiln according to claim 10 wherein the rapid cooling stage comprises a muffle surrounding the ware in the passage and, around the muffle, space for the circulation of cooling air.

12. A continuous pottery kiln according to claim 3 wherein the combustion chambers are supplied with gaseous fuel and means are provided for controlling the admission of primary air, secondary air and tertiary air to each combustion chamber.

13. A continuous pottery kiln according to claim 3 wherein burners are provided in the combustion chambers near the ware exit end of the firing zone and means are provided for introducing secondary air into the combustion chambers on the cooling zone side of the burners.

14. A continuous pottery kiln according to claim 1 wherein the base of said grooves or channels are replaced at least at one end of said passage by a roller conveyor, the conveying surface of which is level with the bottom of the grooves or channels that support said stretchers.

15. A continuous pottery kiln having a passage through which ware is moved and passed through pre-heat, firing and cooling zones comprising in the floor of the passage a pair of continuous parallel grooves or channels which extend for at least the medial and major part of the length of the passage; a row of refractory stretchers resting in and slidable along each of the grooves or channels, and setters forming ware-supporting platforms extending across and resting on the two rows of stretchers and movable therewith along the passage to convey the ware.

References Cited

| | | | |
|---|---|---|---|
| 1,829,290 | 10/1931 | Merrill | 25—142 |
| 1,874,516 | 8/1932 | Hartford | 25—142 |
| 1,877,137 | 9/1932 | Lee | 25—142 |
| 1,965,832 | 7/1934 | Hartford et al. | 25—142 |
| 2,088,554 | 7/1937 | Robson et al. | 25—142 |
| 2,137,091 | 11/1938 | McDougal | 25—142 |
| 3,227,782 | 1/1966 | Gie et al. | 25—142 |

J. SPENCER OVERHOLSER, *Primary Examiner.*

R. D. BALDWIN, *Assistant Examiner.*

U.S. Cl. X.R.

25—144